Patented June 30, 1936

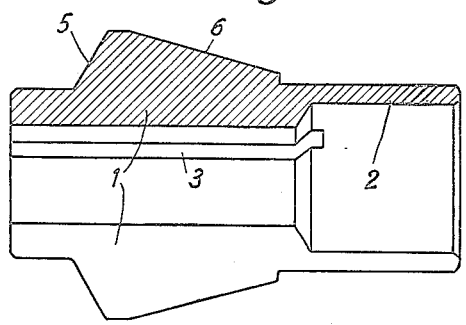
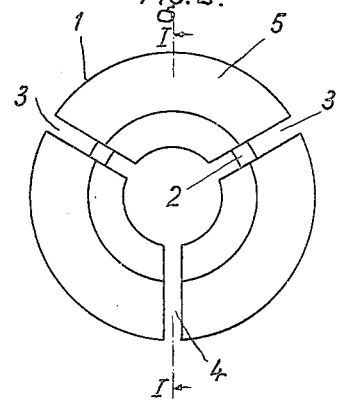
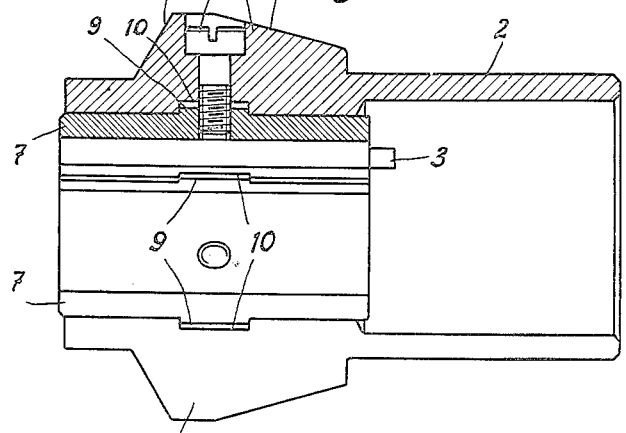
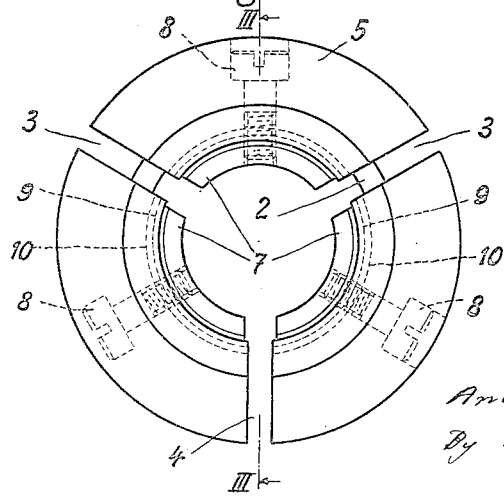

2,046,052

UNITED STATES PATENT OFFICE 2,046,052

SPLIT CHUCK WITH CONICAL HEAD

André Bechler, Moutier, Switzerland

Application April 20, 1935, Serial No. 17,514
In Switzerland April 25, 1934

1 Claim. (Cl. 279—51)

The present invention relates to a collet chuck for so-called automatic lathes or collet machines in which the manufactured articles are cut off as in a slicing lathe from a rod fed through the hollow spindle. The chucks used hitherto in such lathes for gripping the work piece were not adapted to hold the piece well centered between parallel closed jaws.

It is the object of this invention to provide a chuck in which the jaws move in parallelism with each other and where the centering is operated automatically by means of conically shaped jaws.

The invention consists in a collet chuck comprising a ring rendered elastical by a slot and having conical shaped jaws formed at one end of the ring the jaws being separated by slots whereof one is a continuation of the slot in the ring.

The annexed drawing represents as an example two working forms of a chuck according to the invention, said forms are especially intended for a slicing lathe.

Figure 1 is a section on the line I—I of Figure 2 which is a front view of the chuck.

Figures 3 and 4 correspond to the former figures and relate to a second working form.

The chuck as represented in Figures 1 and 2 is made in one piece. It comprises a ring portion 2 and a jaw portion 1. This jaw portion shows three jaws having conical outside surfaces 6 and separated by radial slots 3 whereof one is a continuation of slot 4 of the ring.

The conical outside surfaces 6 are intended to be fitted into a tapered bore of a case or housing not shown which will change the axial stress of the grip into a radial pressure and owing to the elasticity of the ring 2 it will be possible that the jaws close upon the work piece by a parallel movement.

The chuck of Figures 3 and 4 differs from the precedent only by the jaw members 7 fitted to the jaws and held in position by the screws 8 and tongues 9 engaged into the grooves 10 provided in the bore of the jaws.

What I claim as new is:—

Collet chuck for collet machines, a ring rendered elastical by a slot and conical shaped jaws formed at one end of this ring and separated by slots one of which is a continuation of the slot in the ring.

ANDRÉ BECHLER.